US012515919B2

(12) United States Patent
Tietel

(10) Patent No.: US 12,515,919 B2
(45) Date of Patent: Jan. 6, 2026

(54) ELEVATOR AND DOOR LOCK THEREFOR AND METHOD FOR UNLOCKING THEREOF

(71) Applicant: Israel Tietel, Rishon le Zion (IL)

(72) Inventor: Israel Tietel, Rishon le Zion (IL)

( * ) Notice: Subject to any disclaimer, the term of this patent is extended or adjusted under 35 U.S.C. 154(b) by 0 days.

(21) Appl. No.: 18/241,870

(22) Filed: Sep. 3, 2023

(65) Prior Publication Data

US 2024/0083713 A1 Mar. 14, 2024

Related U.S. Application Data

(60) Provisional application No. 63/405,439, filed on Sep. 11, 2022.

(51) Int. Cl.
*B66B 13/14* (2006.01)
*B66B 13/18* (2006.01)

(52) U.S. Cl.
CPC .......... *B66B 13/146* (2013.01); *B66B 13/185* (2013.01)

(58) Field of Classification Search
CPC ..... B66B 13/22; B66B 13/185; B66B 13/146; E05B 2047/0061
See application file for complete search history.

(56) References Cited

U.S. PATENT DOCUMENTS

| | | | | | |
|---|---|---|---|---|---|
| 2,989,148 | A * | 6/1961 | Moser | B66B 13/22 | 187/280 |
| 3,054,475 | A * | 9/1962 | Moser | B66B 13/22 | 340/687 |
| 3,056,470 | A * | 10/1962 | Moser | B66B 13/22 | 324/207.16 |
| 4,471,856 | A * | 9/1984 | Magee | B66B 13/22 | 187/331 |
| 7,350,625 | B2 * | 4/2008 | Deplazes | B66B 13/125 | 187/314 |
| 2005/0034931 | A1 * | 2/2005 | Deplazes | B66B 13/125 | 187/313 |
| 2009/0308116 | A1 * | 12/2009 | Lambrou | E05B 47/02 | 307/104 |
| 2011/0272216 | A1 * | 11/2011 | Kugiya | B66B 13/22 | 187/301 |
| 2014/0339024 | A1 * | 11/2014 | Tyni | B66B 5/0018 | 187/393 |
| 2017/0320704 | A1 * | 11/2017 | Studer | B66B 11/0246 | |
| 2019/0330888 | A1 * | 10/2019 | Cartier | E05B 83/40 | |
| 2024/0083713 | A1 * | 3/2024 | Tietel | B66B 13/146 | |

* cited by examiner

*Primary Examiner* — Michael A Riegelman
(74) *Attorney, Agent, or Firm* — Crowell & Moring, LLP

(57) ABSTRACT

A lock for an elevator door, the lock being a wireless magnetic field induction current controllable lock.

15 Claims, 4 Drawing Sheets

FIG 1 - PRIOR ART

ELEVATOR AND DOOR LOCK THEREFOR AND METHOD FOR UNLOCKING THEREOF

CROSS-REFERENCE TO RELATED APPLICATIONS

This application claims the benefit of priority from U.S. Provisional Application No. 63/405,439 filed Sep. 11, 2022, the disclosure of which is incorporated herein by reference.

TECHNICAL FIELD

The invention relates to the field of elevators and locks for doors of the elevator.

BACKGROUND

FIG. 1 is a front view of a prior art elevator.

The car 12 is shown disposed within the shaft 50 below the highest door 26C, being of the third floor 52C, and above door 26B, being of the second floor 52B.

Even though car 12 includes an opening 60, a passenger 56 housed within car 12 cannot exit car 12, due to the top door 26C and the second door 26B, both being closed and locked, to cover opening 60 of car 12 and thus protecting passenger 56 or 57 from falling into the shaft.

Door 26A of bottom floor 52A is locked by a lock 55A; door 26B of second floor 52B is locked by a lock 55B; and door 26C of third floor 52C is locked by a lock 55C.

A controller 70 controls lock 55A via an electric wire 72A; controls lock 55B via an electric wire 72B; and controls lock 55C via an electric wire 72C.

However, wrong wiring connection, such as connecting wire 72B instead of wire 72A, or a fault within the controller (70), might unlock the wrong lock, or unlock more than one lock simultaneously, exposing person 56 or 57 to danger of falling into the shaft (50).

There is a long felt need to provide a solution to the above-mentioned and other problems of the prior art.

SUMMARY

A lock for an elevator door, the lock being unlocked by a wireless magnetic field induction current.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION

The invention will be understood from the following detailed description of embodiments of the invention, which are meant to be descriptive and not limiting. For the sake of brevity, some well-known features are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
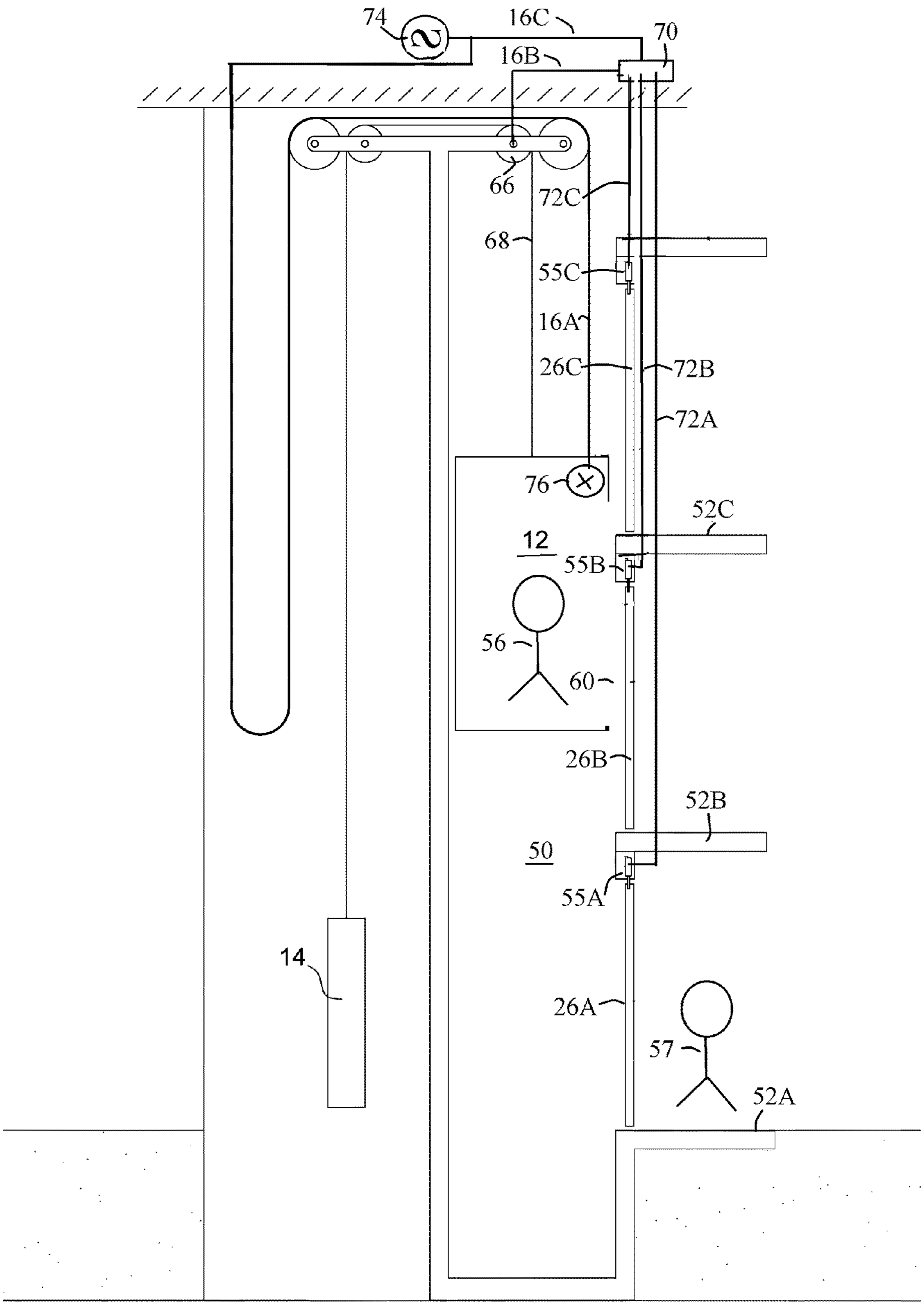
FIG. 1 is a front view of a prior art elevator.
Figure 2:
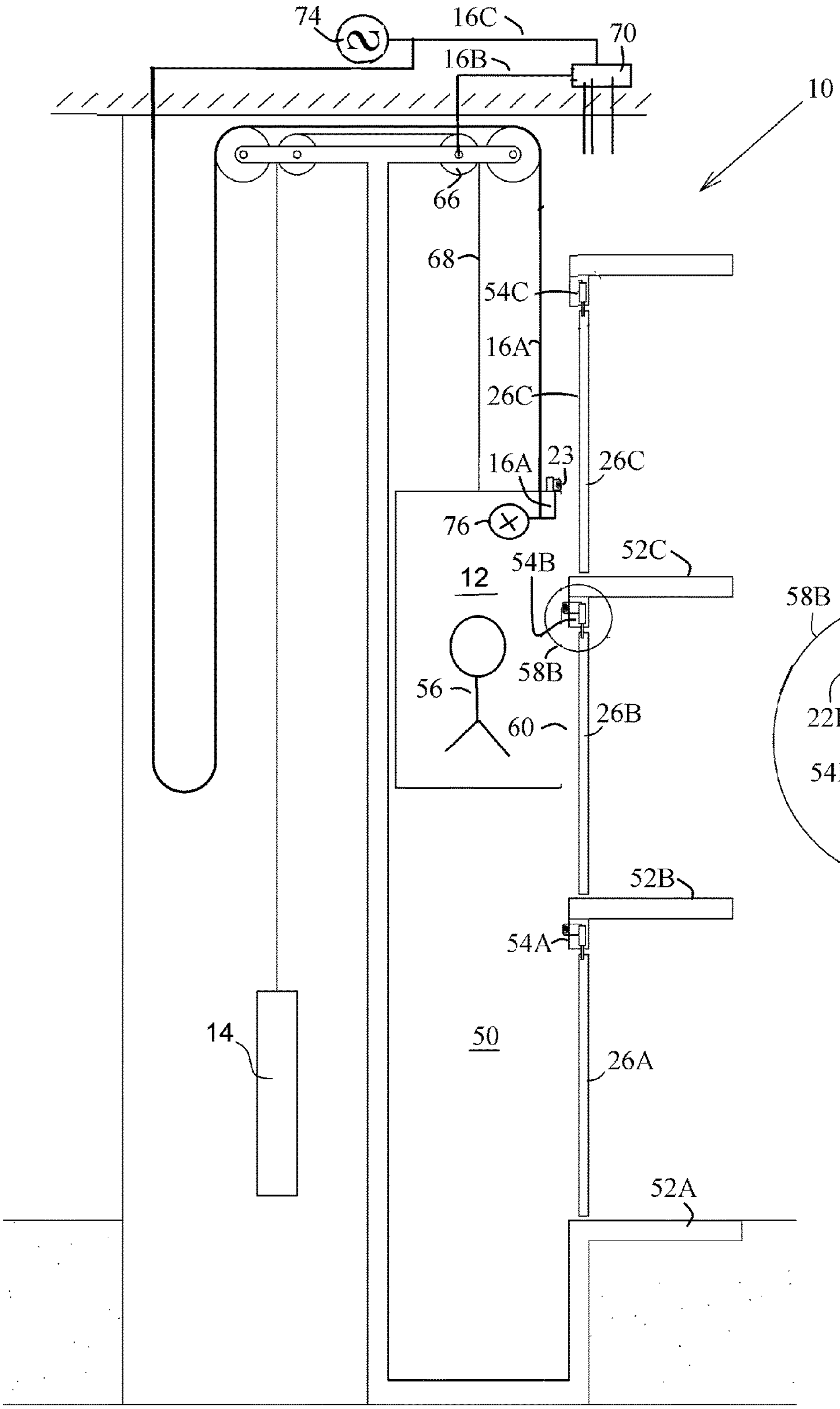
FIG. 2 is a front view of an elevator according to one embodiment of the invention, at the position of FIG. 1.

FIG. 2 is a front view of an elevator according to one embodiment of the invention, at the position of FIG. 1.

Passenger 56 housed within car 12 cannot exit car 12, due to the bottom of door 26B and the top of door 26C, both being closed and locked and covering opening 60, thus keeping the passenger safe.

Door 26A of first floor 52A is locked by a lock 54A; door 26B of second floor 52B is locked by a lock 54B; and door 26C of third floor 52C is locked by a lock 54C.

Figure 3:
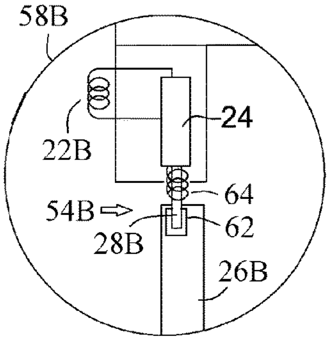
FIG. 3 magnifies the lock of FIG. 2.

FIG. 3 magnifies lock 54B of FIG. 2.

Each of locks 54A, 54B and 54C constitutes a normally-closed short-range-wireless-induced current unlockable lock.

Lock 54B is a wireless magnetic field induction current unlockable lock, as it includes a niche 62 in door 26B; a slidable pin 28B, for entering niche 62, thus for locking door 26B; a spring 64, for normally inserting pin 28B into niche 62; an electro-magnet 24, for sliding pin 28B out of niche 62 against spring 64; and a coil 22B connected to an electronic circuit for energizing electro-magnet 24.

Similarly, lock 54A includes a coil 22A connected to an electronic circuit for sliding pin 28A; and lock 54C includes a coil 22C connected to an electronic circuit for sliding pin 28C.

Coils 22A, 22B and 22C are not connected to any electric powering wire, and thus locks 54A, 54B and 54C are not connected to any electric powering wire.

Referring again to FIG. 2, unlocking door 60 is applied by a coil 23 and its electronic circuit. Electric supply 74 or controller 70 may upon arrival of car 12 to a door, supply electric current to energize the electronic circuit that powers coil 23 of car 12, through electric wire 16A.

At the state of FIG. 2, car 12 is disposed within the shaft 50 below the highest door 26C, being of the third floor 52C, and above door 26B, being of the second floor 52B, neither of coils 22A, 22B, and 22C is energized, as none being near coil 23, thus all locks 54A, 54B and 54C are locked by their springs 64, as shown by pins 28A, 28B, and 28C.

Figure 4:
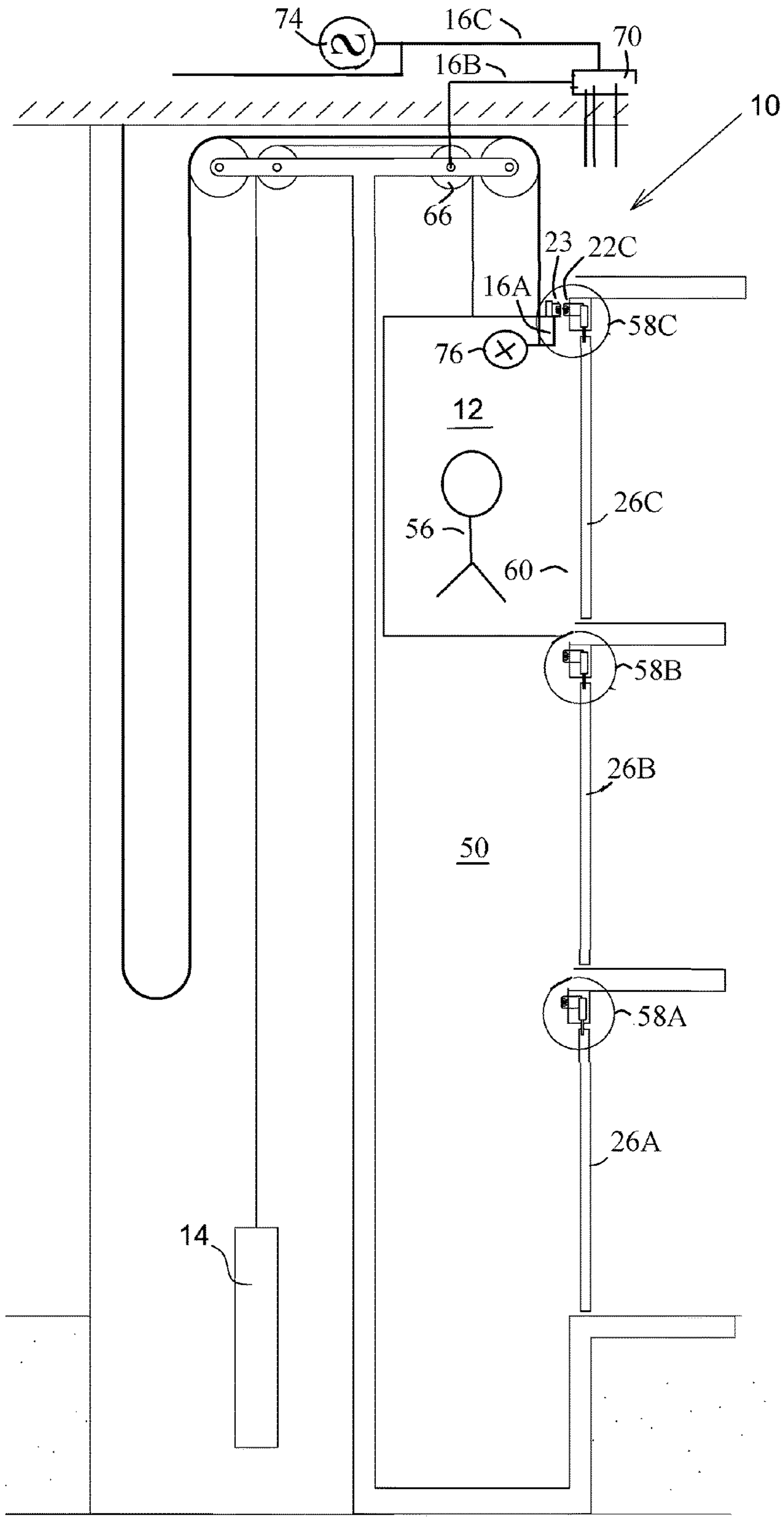
FIG. 4 is the front view of the elevator of FIG. 2, at a different position.

FIG. 4 is the front view of the elevator of FIG. 2, at a different position.

At the state of FIG. 4, car 12 within shaft 50 is disposed facing the highest door 26C.

Figure 5:
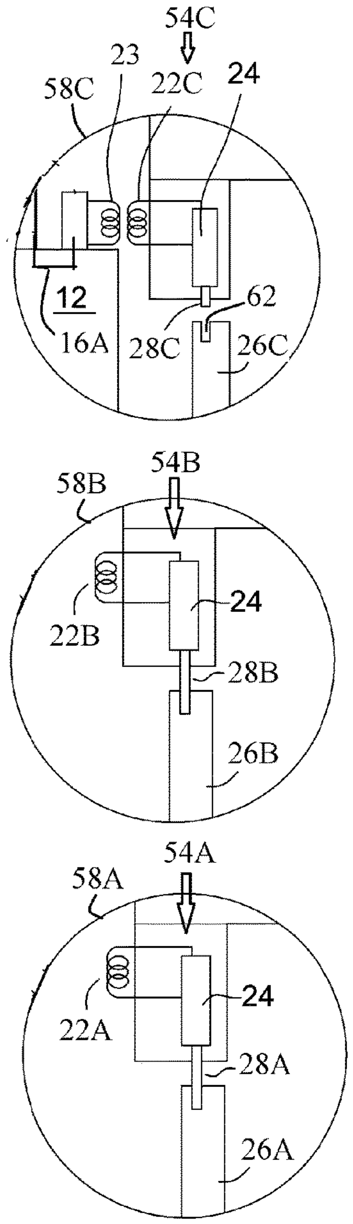
FIG. 5 magnifies the lock of the highest door at the position of FIG. 4.

FIG. 5 magnifies the locks at the position of FIG. 4.

Car 12 as facing the highest door 26C, disposes coil 23 of car 12 near coil 22C of lock 54C of door 26C. Coil 23 is then energized by its electronic circuit when controller 70 supplies current to the electronic circuit, flowing across electric wire 16A, upon arrival to floor 52C, thus coil 23 energizes coil 22C of lock 54C via magnetic field induction, thus coil 22C energizes electro-magnet 24 which removes pin 28 from niche 62, thus opens lock 54C.

Electro-magnet 24 may receive alternating current or direct current from the electronic board connected to coil 22C, depending on the type of the electro-magnet 24.

Referring again to FIG. 3, there is no change in lock 54B between the state of FIG. 4 and the state of FIG. 2—both are locked, since coil 23 is not disposed near lock 54B.

Thus, and referring again to FIG. 5, at this position pin 28C is shown open, whereas pins 28A and 28C are shown closed.

The door locks are unlocked by magnetic field induction current by the car, thus ensuring that the door does not open when there is no car in front of the door.

Figure 6:
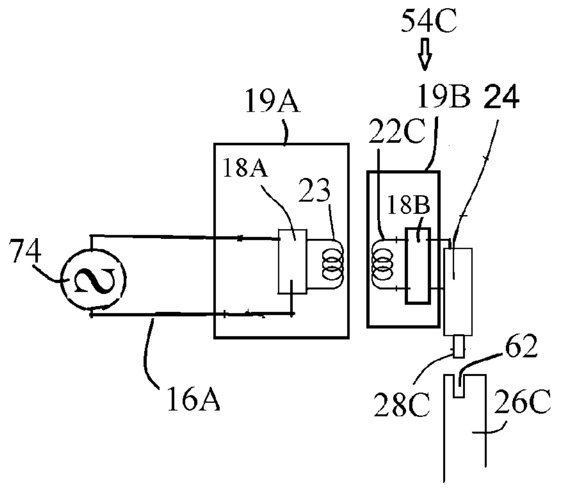
FIG. 6 depicts the elements operating the lock of FIG. 2.

FIG. 6 depicts the elements operating the lock of FIG. 2.

Coil 23 may receive its electric supply from an electric circuit 18A; and coil 22C may receive its electric supply from an electric circuit 18B.

Electric lock 54C may be regarded as including electro-magnet 24 being prior art lock 55C of FIG. 1; plus an assembly 19B including coil 22C and electric circuit 18B.

Assembly 19B may be marketed alone for being connected to the prior art lock 55C of FIG. 1.

Assembly 19A including coil 23 and electric circuit 18A may be marketed together with assembly 19B.

Thus, in one aspect, the invention is directed to an electric lock (54B) for an elevator door (26B), the lock including wireless magnetic field induction current control, for unlocking the lock (54B), thereby electric power supplied to the electric lock for unlocking thereof, includes magnetic induction current only.

The wireless control unlocking may include an electro-magnetic coil (22B) and electronic circuit for energizing an electro-magnet (24) of the lock (54B).

The coil (22B) of the elevator door lock (54B) is for being energized by a coil (23) of a car (12) of the elevator once the coil (23) of the car (12) is disposed near the coil (22B) of the elevator door (26B).

The elevator door lock (54B) does not include any external power wiring thereto.

The lock (54B) may further include a normally-closed pin (28B) for locking the lock (54B) while the coil (22B) is not energized.

The lock (54B) is for being unlocked by wireless magnetic field induction current produced by electric current supplied to the car (12) while facing the lock.

In another aspect, the invention is directed to an elevator (10), including:

- a lock (54B) included in each door (26B) for locking and unlocking the door, the lock (54B) including an electro-magnetic coil (22B), for unlocking the lock (54B) upon energizing the electro-magnetic coil (22B); and
- an electro-magnetic induction coil (23) included in a car (12) of the elevator (10), for energizing the electro-magnetic coil (22B) of each of the doors (26B) of the elevator upon facing thereof.

The coil (23) included in the car (12) is energized upon arrival of the car to each of the doors (26B).

In another aspect, the invention is directed to a method for unlocking a lock (54B) of an elevator door (26B), the method including providing electric power by wireless magnetic field induction, to the lock (54B), by a car (12) of the elevator, once the car (12) is disposed near the elevator door (26B).

In the figures and description herein, the following reference numbers (Reference Signs List) have been mentioned:

- number 10 denotes the elevator according to one embodiment of the invention;
- 14: counter weight;
- 16A: electric wire from electric supply 74 to car 12;
- 16B: electric wire from controller 70 to motor 66;
- 16C: electric wire from electric supply 74 to controller 70;
- 18A,18B: electric circuits;
- 22A,22B,22C,23: magnetic induction coils;
- 26A,26B,26C: doors;
- 28A,28B,28C: slidable pins;
- 50: shaft;
- 52A,52B,52C: floors;
- 54A,54B,54C: locks;
- 55A,55B,55C: prior art locks;
- 56,57: passengers;
- 58A,58B,58C: zones;
- 60: opening of car 12;
- 62: niche;
- 64: spring;
- 68: suspension cable;
- 70: controller of elevator 10;
- 72A,72B,72C: prior art electrical wires from controller 70 to prior art locks 55A,55B,55C respectively;
- 74: electric supply;
- 76: lamp.

The foregoing description and illustrations of the embodiments of the invention have been presented for the purpose of illustration, and are not intended to be exhaustive or to limit the invention to the above description in any form.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

What is claimed is:

1. An electronic unlock system for a plurality of elevator-access doors (26A, 26B, 26C), with at least one elevator-access door of the plurality of elevator doors being disposed at a floor (52A, 52B, 52C) of a multi-level building, said at least one elevator-access door disposed immediately adjacent to and opening upon a vertical elevator shaft; said unlock system comprising:

- an electro-magnet (24) disposed at said door for unlocking said lock; and
- an induction coil (22A, 22B, 22C) of said at least one elevator-access door, configured for wirelessly receiving magnetic induction from an induction coil (23) of an elevator car; of the elevator for energizing said electro-magnet through an electric wire;
- wherein, in a first state, the unlock system is locked and prevents the at least one elevator-access door from opening;
- wherein, in a second state, the unlock system is energized to be unlocked, which can occur only when the induction coil (23) of the elevator car is aligned with and immediately adjacent to the induction coil of the at least one elevator-access door, which alignment and adjacency of the respective induction coils corresponds to an opening of the elevator car being fully aligned with the at least one elevator-access door such that a user can safely transit between an interior of the elevator car and a selected floor through the at least one elevator-access door.

2. The electronic unlock system according to claim 1, not including any external wiring to the at least one elevator-access door's induction coil (22A, 22B, 22C), nor to the electro-magnet (24), such that the electro-magnet and a corresponding elevator-access door's induction coil (22A, 22B, 22C) form an isolated electrical circuit that is immune to electrical faults.

3. The electronic unlock system according to claim 1, comprising a normally-locked pin that prevents the at least one elevator-access door from opening during all times when that specific at least one elevator-access door's induction coil does not wirelessly receive magnetic induction from the induction coil of the elevator car because the elevator car is not present and aligned with that at least one elevator-access door.

4. The electronic unlock system according to claim 3, configured for being unlocked by wireless magnetic induction produced by the induction coil of the elevator car only when the elevator car is facing and aligned with the induction coil of that specific least one elevator-access door, and where a switching of that specific least one elevator-access door is enabled only when the elevator car is positioned in correct alignment with that specific least one elevator-access door.

5. An elevator system comprising:

a lock comprised in each door of a plurality of elevator-access doors (26A, 26B, 26C), each disposed on a vertically-different floor level of a multi-floor structure, each lock comprising an induction coil (22A, 22B, 22C), which lock is in a default locked state and is configured for wirelessly receiving magnetic induction to energize the lock for unlocking said lock; and an elevator car configured to move vertically between the floor levels, with an induction coil (23) comprised in the elevator car, where the induction coil (23) of the elevator car wirelessly provides induction to said induction coil (22A, 22B, 22C) of only one at a time of said doors to unlock a selected door only when the elevator car is aligned with and facing the selected elevator-access door, with the elevator car's induction coil (23) facing and aligned with the selected elevator-access door's induction coil (22A, 22B, 22C).

6. The elevator system according to claim 5, wherein the elevator car's induction coil (23) wirelessly provides said induction only when the elevator car is facing and aligned with the selected door, such that the lock is unlocked and the selected door (but no other door) is openable in a manner allowing safe access through the selected door into and/or out of an interior of the elevator car and where any electrical fault within elevator electrical circuits cannot cause unlocking of an elevator-access door without the elevator car being present behind that elevator-access door and safely vertically aligned with that elevator-access door.

7. A method for safe-only unlocking a lock of an elevator-access door that is openable to an elevator shaft, the method comprising:

providing electric power to wirelessly energize an induction coil of said lock to move the lock from a locked state to an unlocked state, only when an induction coil of an elevator car configured for vertical travel in the elevator shaft is disposed near enough to said elevator-access door for the wireless energization to occur, and where being near enough consists of a position of the elevator car relative to the elevator-access door such that the door, when unlocked, will open into the elevator car and not into the elevator shaft, nor with misalignment of a floor of the elevator car relative to a floor associated with the door.

8. An elevator unlocking system for electric elevator-access door locks configured to unlock an elevator-access door on a plurality of floors of a multi-floor structure, the system comprising:

an induction coil disposed at each floor, each of which induction coil is wired electrically to a corresponding electric elevator-access door lock; and an elevator car's induction coil configured to be disposed on an elevator car for transiting between the floors, where the elevator car's induction coil is energized upon activation of a controller to induce wirelessly electric power in a selected one of the induction coils disposed at a selected one of the floors.

9. The elevator unlocking system according to claim 8, where the electric elevator-access door lock is located at the selected one of the floors, but is powered and unlocks the elevator-access door, only when the elevator car's induction coil faces the induction coil disposed at the selected floor, and the elevator car's coil energizes the induction coil disposed at the selected floor.

10. The elevator unlocking system according to claim 9, configured such that energizing of the induction coil disposed at the selected floor and unlocking of the elevator-access door lock located at that selected floor occurs only when a predetermined offset distance is established between the elevator car's induction coil and the induction coil disposed at that selected floor.

11. The elevator unlocking system according to claim 8, where each electric elevator-access door locks is wired only to its corresponding induction coil at the corresponding selected floor, and where no single electric fault can cause powering of any of the electric elevator-access door locks.

12. An elevator system including the unlocking system of claim 8, comprising an elevator car that includes the elevator car's induction coil.

13. The elevator system according to claim 12, configured such that when the elevator car's induction coil faces the induction coil disposed at the selected floor in sufficient proximity to energize the induction coil disposed at the selected floor, an elevator car's door is situated behind the elevator-access door, and a floor of the elevator car is level with a floor surface of the selected floor.

14. An elevator system according to claim 13, where an unlockable offset beyond which the elevator car's induction coil will not energize and unlock the lock includes a requirement that the elevator car's floor and the selected floor are aligned within a safe distance of each other.

15. The elevator system according to claim 13, configured to include an elevator safety electric-unlocking state, wherein an elevator-access door cannot be unlocked by a single electric fault, with the elevator car not present immediately aligned with an elevator-access door, or when the elevator car's floor is not within a safe distance from that landing floor.

* * * * *